UNITED STATES PATENT OFFICE.

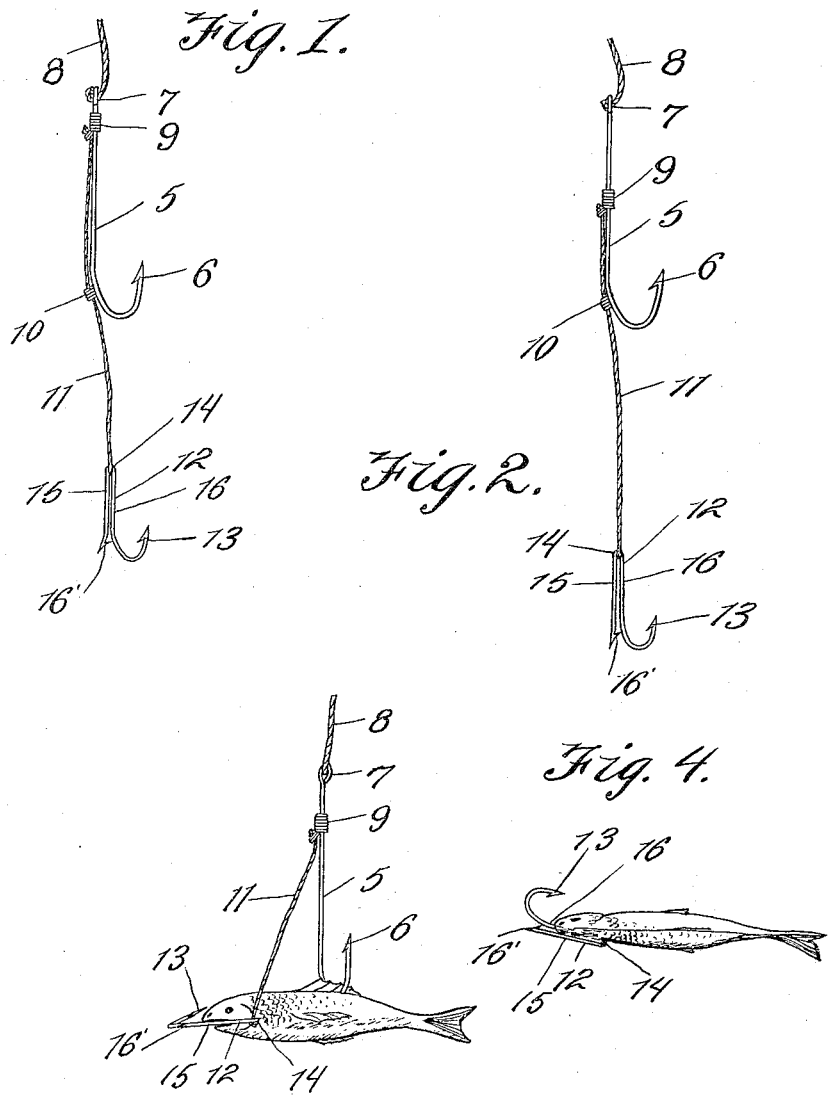

CHARLES LAWRENCE, OF BRADLEYVILLE, MISSOURI.

FISHING APPARATUS.

1,163,244. Specification of Letters Patent. Patented Dec. 7, 1915.

Application filed November 14, 1914. Serial No. 872,149.

*To all whom it may concern:*

Be it known that I, CHARLES LAWRENCE, a citizen of the United States, residing at Bradleyville, in the county of Taney and State of Missouri, have invented certain new and useful Improvements in Fishing Apparatus, of which the following is a specification.

My invention relates to improvements in apparatus, for catching fish, of the general hook and line type.

An important object of the invention is to provide means of the above mentioned character, for securely holding at a plurality of points, a minnow or like bait, without undue injury thereto, and at the same time being highly efficient in catching the fish, when it takes the minnow.

A further object of the invention is to provide means of the above mentioned character, which is so constructed that it is practically impossible for the fish to get the bait without being caught or hooked.

A further object of the invention is to provide apparatus of the above mentioned character, which is readily adjustable for baits or minnows of different sizes.

A further object of the invention is to provide apparatus of the above mentioned character, which is simple in construction, inexpensive to manufacture, strong and durable.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, with the supplemental hook in the elevated position with relation to the main hook, Fig. 2 is a similar view with the supplemental hook lowered with relation to the main hook, Fig. 3 is a side elevation of the apparatus, holding a minnow, and, Fig. 4 is a plan view of the supplemental hook in use.

In the drawings, wherein for the purpose of illustration is shown a preferred embodiment of my invention, the numeral 5 designates a main fishing hook, having a pointed end provided with a tang 6. This hook 5 is provided with an eye 7, for connection with the line 8, as shown.

The numeral 9 designates a securing sleeve or element, which is longitudinally adjustably mounted upon the body portion of the main hook 5. This sleeve is preferably formed of a closely wound coil spring, whereby the same will have proper frictional engagement with the body portion of the hook, to normally remain in one position thereon, but is capable of being longitudinally adjusted upon the application of suitable force. Secured to the curved portion of the main hook 5 is a stationary guide sleeve 10, preferably formed of a closely wound coil spring, the same being soldered or otherwise attached thereto.

Connected with the guide sleeve or element 9 is a flexible element, such as a section of cord or line 11, which is longitudinally adjustably mounted through the guide sleeve 10. This flexible element is adapted to extend downwardly beyond the main hook 5, and has connection with a supplemental hook 12. This supplemental hook is preferably substantially smaller than the main hook and has its pointed end provided with a tang 13. The material of the supplemental hook is bent upon itself at 14, which is preferably the point of connection with the flexible element 11, providing oppositely arranged arms 15 and 16, slightly spaced and preferably extending normally parallel with each other, as shown. At its outer end, the arm 15 is pointed and provided with a laterally extending tang 16' projecting toward the arm 16, which it preferably engages.

In Fig. 3, illustrating the use of the apparatus, the main hook 5 is passed through the skin of the minnow preferably near or rearwardly of its fin, as is customary. The supplemental hook 12 is passed inwardly of the gill of the minnow and out through its mouth, projecting forwardly therebeyond for a substantial distance, as shown. The arm 15 is arranged upon the exterior of the head of the minnow, with its tang 16 engaging with or in advance of the lip or mouth of the minnow, thus preventing the withdrawal of the supplemental hook. The arm 15 is suitably resilient to permit of proper manipulation of the arm in passing the supplemental hook 12 through the mouth of the minnow. The apparatus may be used in connection with baits or minnows of different sizes, as the flexible element 11 may be readily adjusted for that purpose, as is obvious. It is thus seen that should the bait or minnow come off of the main hook 5, when the line is cast, as not infrequently happens, the same will be held upon the supplemental hook 12, thus allowing the same to be recovered and again secured upon the main hook. Besides from this, when the minnow is taken by the fish, such as a bass, the fish ordinarily gets the smaller supplemental hook first, and then the main hook, whereby the fish will be hooked at two separate points, rendering it exceedingly difficult for it to escape.

I do not wish to restrict myself to the precise use of the apparatus, as shown and described.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. In a fishing apparatus of the character described, a main hook to be connected with a line and adapted to engage with the body portion of a minnow, a supplemental hook having its body portion bent upon itself for providing longitudinal arms which are approximately parallel and slightly spaced, one arm being provided with an upwardly bent tanged hooked end and one arm being provided with a tang arranged between the arms, and a flexible element connecting the supplemental hook with the main hook.

2. In a fishing apparatus, a main hook to be connected with a line, a flexible element longitudinally adjustably connected with the main hook, a supplemental hook carried by the flexible element, and a line secured to the main hook, substantially as and for the purpose described.

3. In a fishing apparatus, a main hook, a securing element longitudinally adjustably mounted upon the main hook, a supplemental hook, and a flexible element connecting the supplemental hook and the securing element, substantially as and for the purpose set forth.

4. As an element in a fish catching apparatus, a hook having a body portion bent upon itself to provide a plurality of longitudinally spaced arms, one arm being provided with a tanged hook, and one arm having a laterally extending tang arranged between the arms.

5. In a fishing apparatus of the character described, a main hook to be connected with the line and adapted to engage the body portion of a minnow, a supplemental hook including a plurality of longitudinally spaced arms, one arm being provided with a tanged hook and one arm carrying a laterally extending tang arranged near the hook and disposed between the arms; and a flexible element connecting the supplemental hook with the main hook or line.

In testimony whereof I affix my signature in presence of two witnesses.

CHARLES LAWRENCE.

Witnesses:
WM. SMITH,
J. G. SLONE.

Copies of this patent may be obtained for five cents each, by addressing the "Commissioner of Patents, Washington, D. C."